United States Patent
Tampieri

(10) Patent No.: US 6,679,031 B2
(45) Date of Patent: Jan. 20, 2004

(54) METHOD AND AN APPARATUS FOR FORMING BLISTERS IN A BAND FOR MAKING BLISTER PACKS IN BLISTERING MACHINES

(75) Inventor: Pierluigi Tampieri, Imola (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 0 days.

(21) Appl. No.: 09/913,437
(22) PCT Filed: Dec. 27, 2000
(86) PCT No.: PCT/IB00/01967

§ 371 (c)(1),
(2), (4) Date: Aug. 14, 2001

(87) PCT Pub. No.: WO01/49568

PCT Pub. Date: Jul. 12, 2001

(65) Prior Publication Data

US 2002/0157355 A1 Oct. 31, 2002

(30) Foreign Application Priority Data

Dec. 30, 1999 (IT) .......................................... B099A0720

(51) Int. Cl.[7] .............................................. B65B 31/00
(52) U.S. Cl. ............................. 53/453; 53/452; 53/478; 53/559; 53/329.3; 53/329.4
(58) Field of Search .......................... 53/453, 452, 478, 53/559, 329.4, 329.3

(56) References Cited

U.S. PATENT DOCUMENTS

| | | | | |
|---|---|---|---|---|
| 3,815,322 A | * | 6/1974 | Wyslotsky | 53/511 |
| 5,542,235 A | * | 8/1996 | Konstandin | 53/454 |
| 6,055,794 A | * | 5/2000 | Breitler | 53/453 |
| 6,094,890 A | * | 8/2000 | Michellon et al. | 53/453 |
| 6,101,790 A | * | 8/2000 | Mori et al. | 53/453 |
| 6,109,000 A | * | 8/2000 | Conti | 53/51 |

* cited by examiner

Primary Examiner—Rinaldi I. Rada
Assistant Examiner—Brian Nash
(74) Attorney, Agent, or Firm—William J. Sapone; Coleman Sudol Sapone, P.C.

(57) ABSTRACT

According to a method for forming a blister band (1) for blister pack (10) in blistering machines (M), a band (1) of heat-formable material is moved stepwise through a preheating station (5), a forming station (6), where a regular series of blisters (20) is formed, a filling station (8), where the blisters (20) are filled with relative articles, a sealing station (9), in which the blister band is sealed with a covering band (11), and a cutting off station (13), where the blister band is cut into single blister packs (10). The method includes gradual heating, during the stepwise movement of the band (1) in the preheating station (5), of selected areas (24a, 24b, 24c) of the band (1). The areas (24a, 24b, 24c) are distributed regularly within a cold grid-like zone and have an extent suitably bigger than the extent of the blisters (2) made in the region of the heated areas (24a, 24b, 24c).

16 Claims, 3 Drawing Sheets

METHOD AND AN APPARATUS FOR FORMING BLISTERS IN A BAND FOR MAKING BLISTER PACKS IN BLISTERING MACHINES

FIELD OF THE INVENTION

The present invention relates to production of blister bands in so-called blistering machines. More precisely, the present invention relates to a method and apparatus for forming the blister band of blister packs.

DESCRIPTION OF THE PRIOR ART

At present, blistering machines form blisters in a continuous band of heat-formable material and subsequently fill the obtained blisters with articles. Afterwards, the blister band, filled with articles, is closed by welding a sealing sheet and cut in portions to obtain single blister packs.

The band of heat—formable material is unwound from a bobbin and is conveyed on a horizontal plane between the opposite plates of a preheating station and then to the forming station, where suitable means form the blisters in the band, which is deformable due to the heat action. One of the disadvantages of known blistering machines derives from the scarce flatness of the obtained blister packs.

This is primarily due to the dilatation of the heat-formable band caused by the heating necessary to form the band, and to the subsequent shrinking of the band when it returns to the environment temperature, after the sealing sheet has been applied.

The shrinkage is not uniform due to the fact that the blister band is not physically homogeneous.

Another drawback of known machines derives from the fact that the shrinkage of the blister band is different from the shrinkage of the sealing sheet.

The latter drawback has been noted also in case the blister band has been made from a heat-forming material like polypropylene, preferred recently most of all for ecologic reasons.

It is to be noted that the shrinkage of the above mentioned material, and consequently, the bending of the blister band and subsequent blister packs continues for a long time after the forming and sealing steps, before the blister packs can reach a stabile state, which affects negatively also the subsequent production steps, e.g. piling and packaging the blister packs in boxes.

Although the bending of the blister packs does not compromise their fundamental function to contain and protect articles from external agents action, it constitutes a visible defect.

This defect is more visible if the blister packs are sold singularly instead of closed in a box.

A known technique for avoiding this problem includes partial heating of the heat-formable band, in practice only in the areas which are to be heat-formed, as described e.g. in the Japanese document No. 2.690.243.

According to the solution proposed by the above mentioned document, the heat-formable band is heated locally by a series of heating members, of gradually increasing dimensions, whose form is the same as the blisters to be formed.

The dimensions of the final heating members are almost the same as blisters dimensions.

This way, when the blisters are being formed, only the heated area, corresponding to the blisters area is deformed, and the surrounding area of the band remains not deformed.

The above mentioned technique resolves effectively the problem of substantially aesthetic nature, thus allowing to obtain essentially flat packs.

However, this solution causes a considerable reduction of the packages protection capacity, i.e. their primary function.

In fact, it is evident that the deformation of only one area of the band, whose dimensions are at most equal with the blister dimensions, cause a corresponding reduction of the band thickness in this area.

Therefore, the mechanical resistance of the band in the region of the blisters is reduced and likewise its capability of protecting the articles from external agents.

SUMMARY OF THE INVENTION

The object of the present invention is to solve the above problem, by proposing a method, which allows to form the blister band for making the blister packs maintaining its flatness and without changing its capability of protecting the articles packaged therein.

Another object of the present invention is to propose an apparatus for forming blister band, whose structure is simple, and which is functional and can be easily applied to known blistering machines.

The above mentioned objects are obtained, in accordance with the content of the claims, by a method for forming a blister band for blister packs in blistering machines, with a band of heat-formable material fed in an intermittent way with a step in a forward direction through a preheating station, a forming station for forming a regular series of blisters thus obtaining a blister band, a filling station for filling said blisters with articles, a sealing station for sealing the blister band with a sealing band, and a cutting station for cutting the blister band into single blister packs,. In said preheating station respective areas of said heat-formable band are heated gradually during a stepwise movement of said heat-formable band, the areas of the heat-formable band being distributed regularly within a cold grid-like zone and having extension suitably bigger than the extension of said blisters made in the region of said heated areas.

The method is carried out by an apparatus mounted on a machine including means for feeding the band of heat-formable material in an intermittent way by a step through a preheating station, a forming station for forming a regular series of blisters in the heat-formable band and obtaining a blister band, a filling station for filling the blisters with articles, a sealing station for applying, a sealing band to the blister band, and a cutting off station for cutting the blister band into single blister packs. The apparatus is characterized in that the preheating station includes heating means acting in a differentiated way to heat respective areas of said heat-formable band gradually during a stepwise movement of said heat-formable band, said areas of the heat-formable band being distributed regularly within a cold grid-like zone and having extension suitably bigger than the extension of said blisters made in the region of said heated areas.

BRIEF DESCRIPTION OF THE DRAWINGS

The characteristic features of the present invention will be pointed out in the following description of two non limitative embodiments, with reference to the enclosed drawings, in which.

BEST MODES OF CARRYING OUT THE INVENTION

Figure 1:
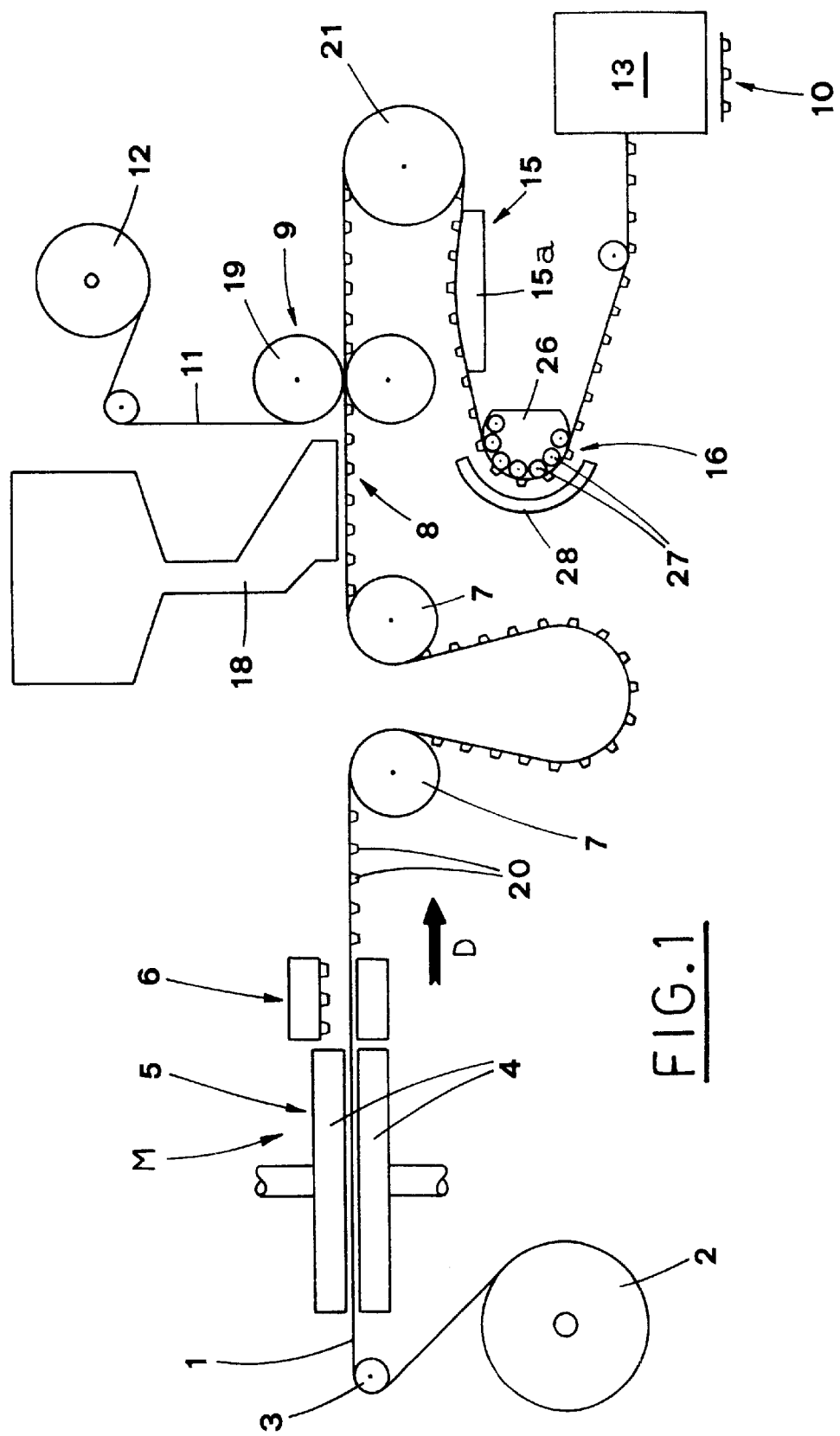
FIG. 1 is a schematic lateral view of a blistering machine equipped with the proposed apparatus for forming a blister band from which blister packs are to be obtained.

With reference to FIG. 1, the blistering machine M forms blisters in a continuous band 1 of heat-formable material and subsequently fills the obtained blisters with respective articles.

The band 1 of heat-formable material, preferably polypropylene, unwinds in an intermittent way from a bobbin 2, rotating about a horizontal axis, and is conveyed on a horizontal plane by a idler roller 3.

Moving on the horizontal plane, the band 1 is conveyed between two opposed plates 4 of a preheating station 5 and subsequently to the station 6, in which the blisters 20 are formed.

When leaving the blisters forming station 6, the band 1 engages with a pair of rollers 7, which define a compensation loop of the band 1 and then the band proceeds with the blisters 20 turned upwards in the subsequent filling station 8, in which known articles feeding means, not shown, operate.

The blister band 1, filled with articles, is then closed by welding a sealing band 11 and cut to obtain single blister packs 10.

The sealing band 11 unwinds from the relative bobbin 12, rotating about a horizontal axis, and is conveyed to cover the blister band 1 in a sealing station 9, where known means 19 for welding the bands 1, 11 operate.

Figure 2:
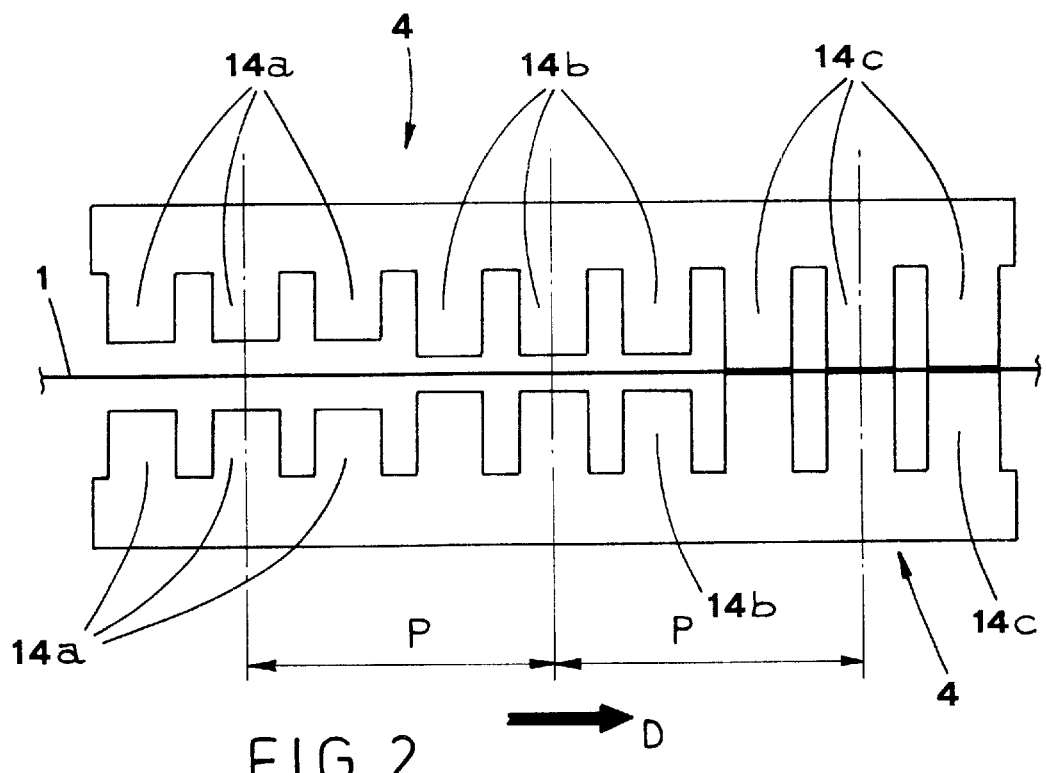
FIG. 2 is a lateral, enlarged section view of an area of the apparatus in the region of the band preheating station in the blistering machine.
Figure 4:
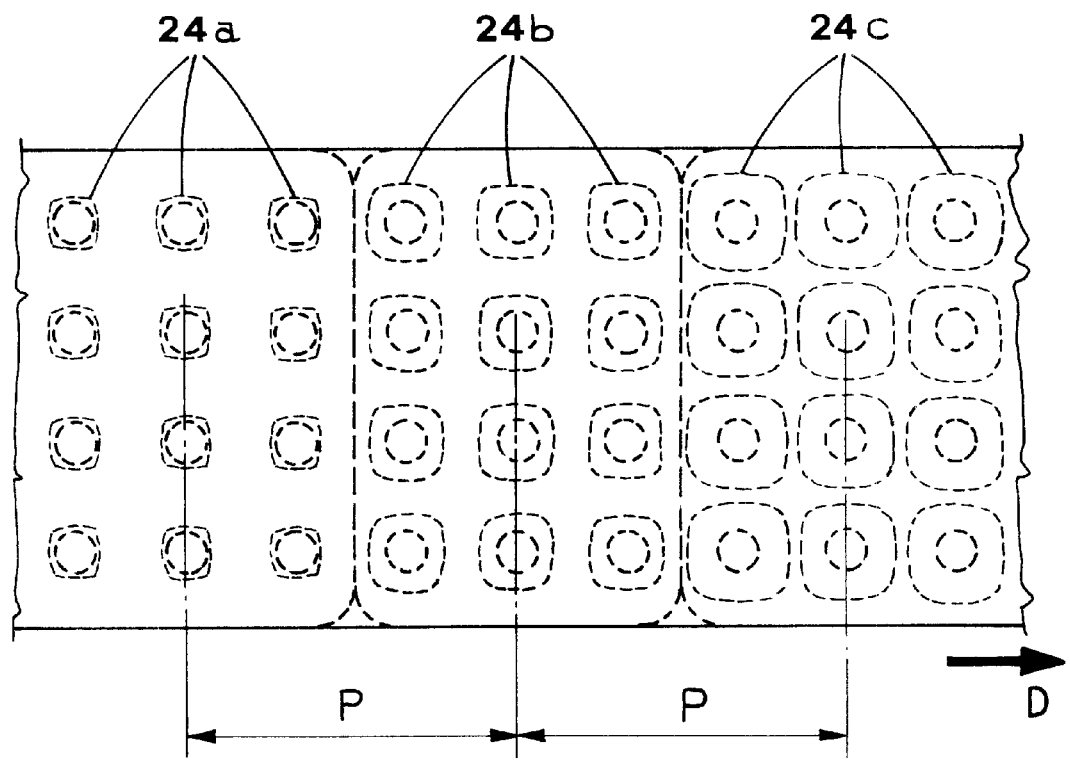
FIG. 4 is a corresponding plan view of the blister band in the preheating area.

In the pre-heating station 5 for the heat-formable band 1, according to the present invention, the plates 4 carry a series of located heating members 14 aimed at progressively heating an area, whose width is suitably bigger than the blister 20 shape (see FIGS. 2 and 4).

According to a non limitative embodiment shown in FIG. 4, there is provided:
at least one first series of heating members 14a, vertically distant from the band 1, so as to heat a limited area 25a of the band 1, which is bigger than the shape of a single blister 20;
at least one second series of heating members 14b, vertically closer to the band 1, so as to heat an area 24b, correspondingly bigger than area 24a;
and at least one third series of heating members 14c, substantially touching the band 1, so as to heat an area 24c, whose width is bigger than the area 24b, and therefore, than the area 24a.

The number of heating members 14a, 14b, 14c of each series is equal to the number of blisters 20 to be obtained in each blister pack, in the shown example case each series of heating members 14a, 14b, 14c is divided in three groups of three lines transversal to the forward movement direction D of the band 1; the dimension in the direction D of each group corresponds substantially to a step P of the band 1 movement.

As it is better shown in FIG. 2, it is to be noted that all the heating members 14a, 14b, 14c have the same cross section, since the different width of the respective heated areas 24a, 24b, 24c is determined only by the vertical distance of the heating members 14a, 14b, 14c from the heat-formable band 1.

Thus, the stepwise movement of the band 1 between the plates 4 of the preheating station 4 causes heating of areas having increasing width, distributed regularly in the cold band 1.

During the passage in the forming station 6, the blisters 20 are formed in the region of the heated areas 24a, 24b, 24c of the band 1, e.g. by punches or other means (shown in FIG. 4 by broken line circles) acting on the band 1.

Forming operation of the blisters 20 deforms the heated areas 24a, 24b, 24c of the band 1, whose surface is bigger than the processed area of the blisters 20 to be made.

This allows to limit the reduction of the band 1 thickness in the region of the blisters 20.

Actually, the extension of the heated areas 24a, 24b, 24c is determined in relation to the desired final thickness of the band 1 in the region of the blisters 20.

Figure 3:
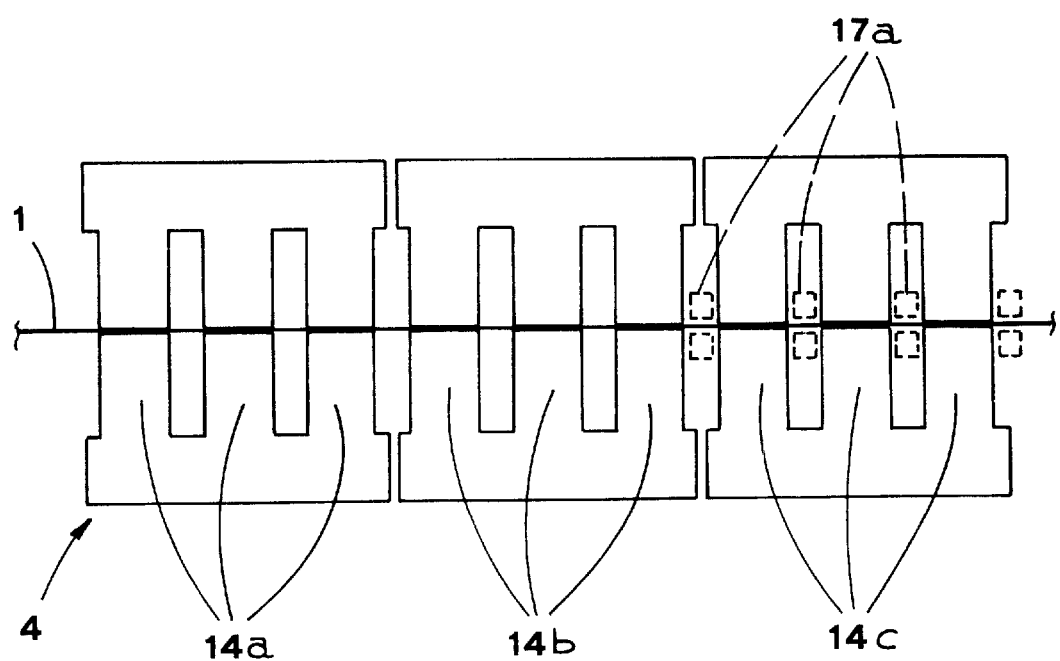
FIG. 3 is a lateral section view of the preheating area, according to another embodiment of the apparatus.
Figure 5:
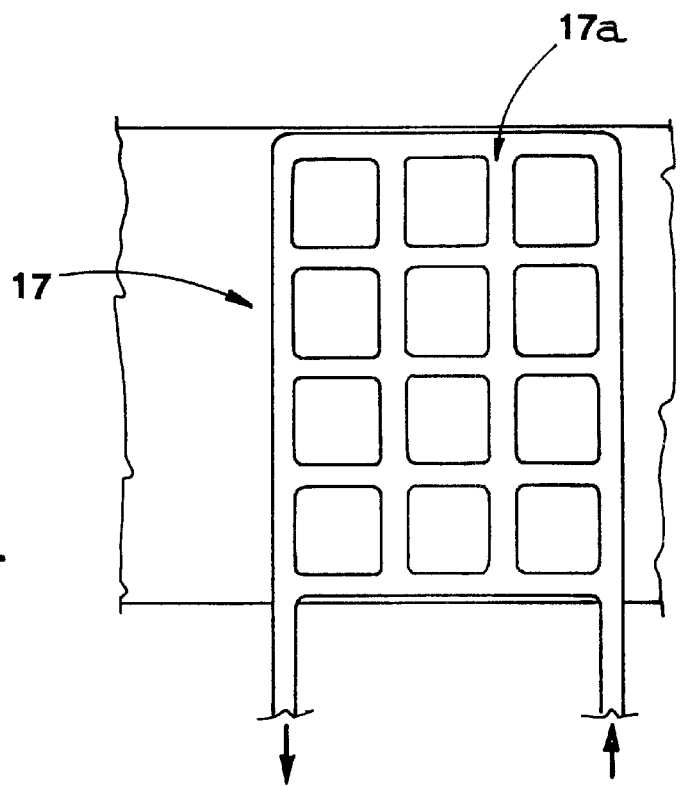
FIG. 5 is a plan view of an area of the blister band, which is subjected to the action of cooling means, situated in the above preheating station.

FIGS. 3 and 5 show another embodiment of the proposed apparatus, using the same practical principle, and according to which the distance between the heat-formable band 1 and all the heating members 14a, 14b, 14c is constant, i.e. the heating members substantially touch the band 1, to heat the areas 24a, 24b, 24c.

According to this embodiment, cooling means 17 are situated in the area surrounding and containing the heating members 14a, 14b, 14c.

The cooling means 17 are aimed at removing heat in the zones of the band 1 surrounding the areas 24a, 24b, 24c.

The cooling means 17 preferably include a radiator 17, inside which a suitable cooling liquid circulates, and which substantially touches the upper and lower faces of the band 1 and which is aimed at defining a grid-like cooling circuit 17a surrounding the areas 24a, 24b, 24c.

It is also possible to use, in the above mentioned area surrounding and containing the heating members 14a, 14b, 14c, insulating means, which avoid heat transmission.

The insulating means can cooperate with the above mentioned cooling means 17.

It is to be noted that the cooling and/or insulating of the area surrounding and containing the heating members 14a, 14b, 14c is particularly important because for heating the areas 24a, 24b, 24c a large amount of heat is necessary, bigger than the amount of heat necessary for heating areas equal to the exact extension of the blisters 20.

According to another embodiment, not shown, the heating members 14a, 14b, 14c are situated at the same distance from the heat-formable band 1, i.e. substantially touching the latter, so as to obtain the heated areas 24a, 24b, 24c. However, the heating members are not heated in the same way, so as to determine application of increasing amounts of heat.

As shown in FIG. 1, downstream of the sealing station 9, between this sealing station and the final station 13, in which single blister packs 10 are cut, the sealed blister band 1 winds around a turning over roller 21, which allows the surface of the band 1 opposite to the surface with the blisters 20 and sealed with the band 11, to engage with straightening means 15, 16 aimed at obtaining correct flatness of the sealed blister band 1 and consequently, of the blister packs 10.

In other words, the straightening means 15, 16 are aimed at correcting possible deformations or bending of the band 1.

More precisely, there are first straightening means 15, which include a guide 15a featuring a slightly curved surface, suitably cooled, on which the blister band 1 slides, and second straightening means 16, which includes a support 26, carrying a series of idler rollers 27, on which the blister band 1 slides, so as to be slightly deformed to correct possible deformations or bending caused by the heat supplied in the sealing station 9.

A suitably cooled curved wall 28 is situated in front of the support 26.

Therefore, the proposed apparatus and method obtain the object to form the blister band 1 of blister packs 10 maintaining the band flat, without reducing the articles protection given by the blister band 1.

The spotted heating of the heat-formable band 1 is defined in such a way as to allow to maintain a correct thickness in the region of the blisters 20, when the latter are formed, while the cool grid-like zone there around assure a correct flatness of the blister packs 10 particularly due to the simultaneous cooling of the blister area of the band 1.

Moreover, the straightening means 15, 16 allow to avoid deformations which could be caused by the sealing of the blister band 1.

The structure of the apparatus for forming blister band is simple and functional and can be easily used with the known blistering machines M.

What is claimed is:

1. A method for forming a blister band (1) for blister packs (10) in a blistering machine (M), comprising feeding a band (1) of heat-formable material intermittently through a preheating station (5), a forming station (6) for forming a regular series of blisters (20) to obtain a blister band, a filling station (8) for filling said blisters (20) with articles, a sealing station (9) for sealing the blister band with a sealing band (11), and a cutting off station (13) for cutting the blister band into single blister packs (10), wherein in said preheating station (5), the method further comprises gradually heating a plurality of selected areas (24a, 24b, 24c) of said heat-formable band (1) during a stepwise movement of said heat-formable band (1) therethrough, said selected areas (24a, 24b, 24c) of said heat-formable band (1) being distributed regularly within a cold grid zone and each selected area being of an extent bigger that an extent of said blisters (20) made in said selected heated areas (24a, 24b, 24c); and placing the heating means (14a, 14b, 14c) equally distant vertically from said heat-formable band (1) and differentially heating the selected areas by supplying increasing amounts of heat thereto.

2. The method according to claim 1, further comprising cooling the grid-like zone surrounding the selected heated areas (24a, 24b, 24c).

3. The method according to claim 1, further comprising insulating the grid zone surrounding the heated areas (24a, 24b, 24c) to avoid heat transmission thereto.

4. The method selected according to claim 1, further comprising placing heating means (14a, 14b, 14c) at a different vertical distance from said heat-formable band (1) and gradually setting the heating means closer to said heat-formable band.

5. The method according to claim 2, further comprising placing the heating means (14a, 14b, 14c), equally distant vertically from said heat-formable band (1).

6. The method according to claim 3, further comprising placing the heating means 14a, 14b, 14c), equally distant vertically from said heat-formable band (1).

7. The method according to claim 1, further comprising correcting deformations and bending of the band (1) created by heat supplied to said sealing station (9).

8. An apparatus for forming a blister band (1) for blister packs (10) in a blistering machine (M), the machine comprising means for feeding a band (1) of heat-formable material in an intermittent way, the machine having a preheating station (5), a forming station (6) for forming a regular series of blisters (20) in the heat-formable band (1) to obtain a blister band, and a filling station (8) for filling the blisters (2) with articles, a sealing station (9) for applying a sealing band (11) to the blister band, and a cutting of station (13) for cutting the blister band into single blister packs (10), wherein said preheating station (5) has heating means (14a, 14b, 14c) for differentially gradually heating selected areas (24a, 24b, 24c) of said heat-formable band (1) during stepwise movement of the heat-formable band therethrough, said selected areas (24a, 24b, 24c) of the heat-formable band (1) being distributed regularly within a cold grid zone and each selected area being of an extent bigger that an extent of said blisters (20) made in said selected areas (24a, 24b, 24c).

9. The apparatus according to claim 8, wherein said heating means are situated at a different vertical distance from said heat-formable band (1) and are gradually set closer to said heat-formable band (1) in a forward direction (D).

10. The apparatus according to claim 8, wherein said heating means are equally distant vertically from said heat-formable band (1), said heating means (14a, 14b, 14c) being differentially heated so as to supply increasing amounts of heat thereto.

11. The apparatus according to claim 8, further comprising cooling means (17) for removing heat from the grid zone surrounding and containing said heating means.

12. The apparatus according to claim 8, further comprising insulating means insulating said heating means (14a, 14b, 14c).

13. The apparatus, according to claim 8, wherein said heating means has a plurality of heating members (14a, 14b, 14c) each having a common cross section.

14. The apparatus according to claim 8, further comprising downstream of said sealing station (9), means (15) for straightening said blister band (1), said straightening means including a guide (15a) having a curved, cooled surface, on which the band (1) slides.

15. The apparatus according to claim 8, further comprising downstream of said sealing station (9), means (16) for straightening said blister band (1), said straightening means comprising a support (26) carrying a series of idler rollers (27), on which said blister band (1) slides for correction of deformations or bending caused by heat supplied in said sealing station (9).

16. The apparatus according to claim 15, wherein a cooled curved wall (28) is situated in front of said support (26).

* * * * *